United States Patent [19]

Kickuth

[11] Patent Number: 5,637,218
[45] Date of Patent: Jun. 10, 1997

[54] FLOW CONTROL FOR EVENING OUT WASTE WATER INFLOW IN SOIL-BASED INSTALLATIONS FOR WASTE WATER PURIFICATION

[76] Inventor: Reinhold W. Kickuth, Feldbergring 11, 37249 Neu-Eichenberg-Hermannrode, Germany

[21] Appl. No.: 440,610

[22] Filed: May 15, 1995

[30] Foreign Application Priority Data

Jan. 7, 1995 [GB] United Kingdom ............... 9500320.8

[51] Int. Cl.$^6$ ................................................. C02F 3/32
[52] U.S. Cl. .................... 210/602; 210/747; 210/170; 210/195.1; 210/257.1
[58] Field of Search ..................... 210/602, 621, 210/747, 170, 195.1, 257.1, 258, 259, 242.1

[56] References Cited

U.S. PATENT DOCUMENTS

| | | | |
|---|---|---|---|
| 3,770,623 | 11/1973 | Seidel | 210/602 |
| 4,333,837 | 6/1982 | Plosz et al. | 210/747 |
| 4,415,450 | 11/1983 | Wolverton | 210/602 |
| 4,678,582 | 7/1987 | Lavigne | 210/150 |
| 4,839,051 | 6/1989 | Higa | 210/602 |
| 4,904,386 | 2/1990 | Kickuth | 210/747 |
| 5,174,897 | 12/1992 | Wengrzynek | 210/170 |
| 5,273,653 | 12/1993 | Kickuth | 210/602 |

FOREIGN PATENT DOCUMENTS

| | | |
|---|---|---|
| 2272213 | 5/1994 | United Kingdom . |
| WO87/04424 | 7/1987 | WIPO . |

OTHER PUBLICATIONS

Eckenfelder, Jr. "Principles of Water Quality Management" 1980, pp. 179–182.

Primary Examiner—Christopher Upton
Attorney, Agent, or Firm—Dougherty, Hessin, Beavers & Gilbert

[57] ABSTRACT

The inflow control means comprise either a contact buffer or a buffer reservoir and pump means or both in combination with the inlet of a soil-based filter bed like a root space installation. The contact buffer is in direct flow communicating contact with an upper section of the filter bed on the infiltration side and dimensioned in adaptation to the throughput capacity of the soil-based filter bed such that variations in the waste water inflow are evened out. The same effect is achieved by the buffer reservoir and pump means wherein the pump delivers waste water from the buffer reservoir to the inlet and excess waste water is returned from the inlet to the buffer reservoir through a return line having a receiving end at a level which is preferably adjustable relative to the top surface of the filter bed. For evening out large differences in the waste water inflow, the contact buffer and the buffer reservoir including the pump means are preferably combined such that the buffer reservoir flow communicates with the contact buffer. The pump means, then, are adapted to be operated in the event that the variation in the waste water inflow exceeds the predetermined waste water inflow variations buffered by means of the contact buffer.

42 Claims, 4 Drawing Sheets

FIG. 1

FIG. 2
VARIATION OF WASTE WATER INFLOW AS A FUNCTION OF DAYTIME

FIG. 3
INFLOW VARIATION AS A FUNCTION OF DAYTIME UNDER THE
ACTION OF A SUBMERGED PUMP

FLOW CONTROL FOR EVENING OUT WASTE WATER INFLOW IN SOIL-BASED INSTALLATIONS FOR WASTE WATER PURIFICATION

The present invention relates to flow control means associated with a soil-based waste water purifying installation containing a soil-based filter bed, which has a predetermined hydraulic throughput capacity and through which waste water is passed for purification, and further containing an inlet receiving a waste water inflow to be purified and communicating with the soil-based filter bed.

The invention also relates to a method of controlling the flow of waste water in a soil-based waste water purifying installation wherein a waste water inflow is infed into an inlet and passed from the inlet through a soil-based filter bed having a predetermined hydraulic throughput capacity.

Installations of this type for waste water purification have been called, for example, root space installations, plant installations for waste water treatment, plant-containing filter beds, plant-containing solid bed reactors, marsh-bed stages for waste water treatment, constructed wetlands etc. Such installations are distinguished by extremely low energy requirements, minimum operating costs, long service life, and unusually high and multifarious purification power, also with respect to persistent compounds, particularly when utilising the complex chemical, biochemical and physical properties of structured and activated top soils. This is especially true for installations which do not employ plain bulk material, e.g. sand, gravel, slag, rock gravel, lava etc. as the material forming the solid bed but genuine biogenously structured or biogenously structurable substrates, i.e. soils, strictly speaking.

The full use of the advantages provided by such installations, however, may be rendered difficult or may become restricted due to hydraulic conditions unless specific constructional steps are taken and a diligent soil selection is made.

It is positive knowledge that even heavy, clay and coarse clay containing soils, due to the root activity and microbial action in the area close to the roots, can attain high hydraulic throughput capacity characterized by a hydraulic conductivity in the range of about $5 \cdot 10^{-4}$ m/sec in the root-penetrated area. While this corresponds to the conductivity of medium to coarse sand, this is still a limiting factor when considering that an operating depth of only 0.6 meters is available upon horizontal infiltration in an installation of this type.

As a consequence, an installation designed for a population equivalent of e.g. 1000, a daily inflow of about 150 m³ of waste water corresponding to $1.74 \cdot 10^{-3}$ m³/sec and an activatable hydraulic gradient of 0.03 would require an infiltration cross-section of 116 m² in order to effect the passage of the waste water through the soil. At an operating depth of 0.6 meter, this would imply an installation having a width of 193.3 meter.

This problem has been recognized in U.S. Pat. No. 5,273,653 and technical ways of solving the problem have been demonstrated therein. Also, reference is made therein to the difficulties originating in connection with vertical infiltration into such filter beds which is frequently suggested as an expedient.

Figure 1:
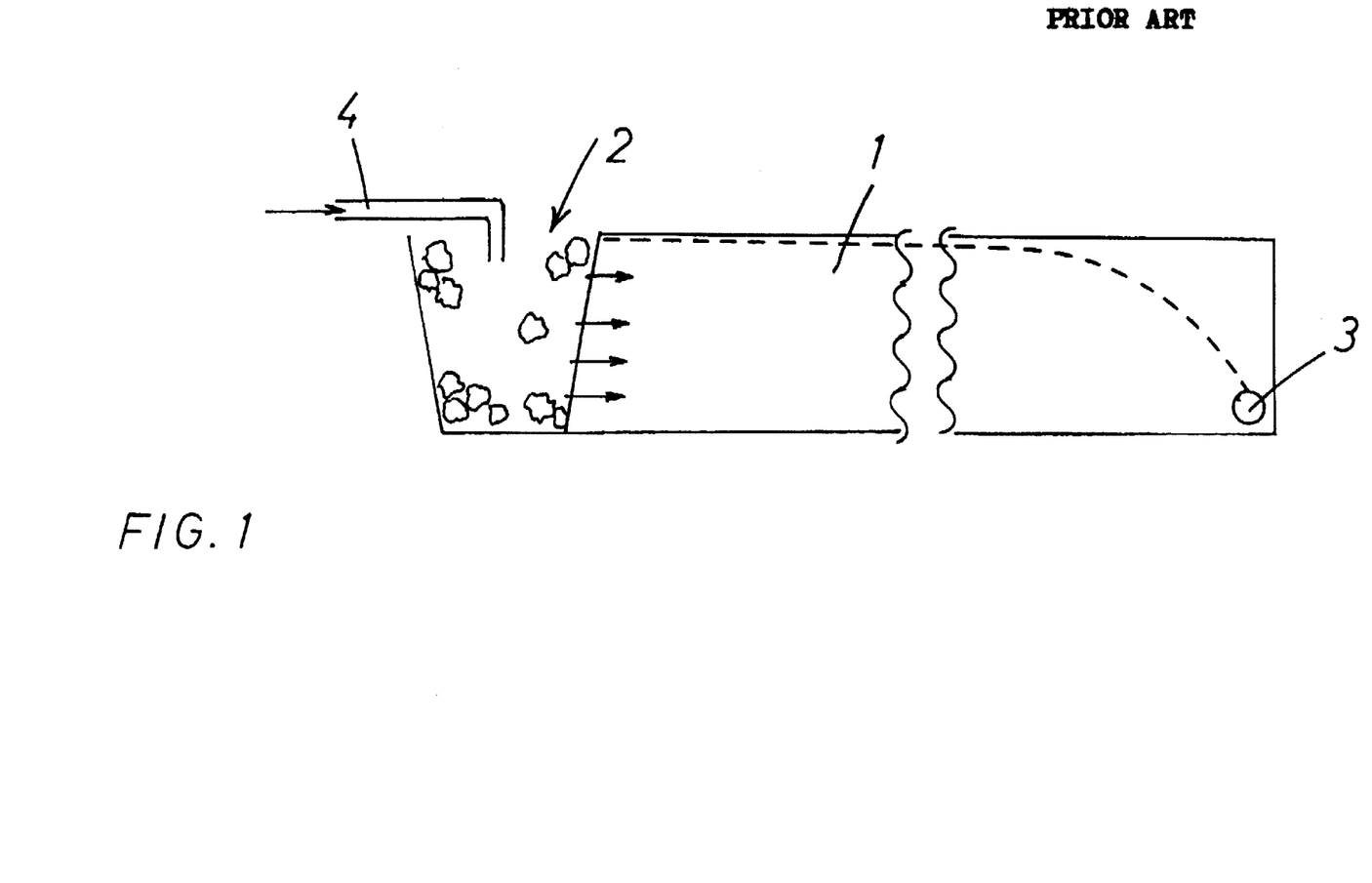
FIG. 1 is a schematic longitudinal section through a prior art soil-based filter bed.

A further problem results from the fact that the waste water does not arrive in an even or uniform manner but rather in an amount which is a function of daytime; a typical domestic waste water vs. daytime curve is illustrated as an example in FIG. 1 of the drawings in the instant application.

It will be evident from the illustration of FIG. 1 that the waste water inflow at certain daytimes is much higher and, at other daytimes, much lower than the average which is calculated for 24 hours. This implies that the installation is either not fully utilised or overloaded by the inflow, whereby the intended purifying capacity is not provided because, in the case of an overload, the waste water partially flows across the installation and thereby is subjected only to minimum purification.

During the planning stage and by administrative requirements this non-uniformity of waste water inflow is taken into account by computation whereby the daily amount ($Q_{24}$) calculated for 24 hours is "condensed" to 10 hours of the day ($Q_{10}$) and used as the basis of hydraulic calculations for the construction of the installation. In the aforementioned example related to the population equivalent of 1000, such "condensation" would result in a waste water inflow of $4.17 \cdot 10^{-3}$ m/sec and, consequently, an installation width of 464 meters.

Particularly when considering small installations, this technical problem becomes fully effective because in this case the typical variation of domestic water requirements with time makes itself fully felt at the waste water inflow and thus at the treatment installation.

Even when taking into account the technical possibilities recited in the aforementioned U.S. Pat. No. 5,273,653, it will be evident that there is a strong interest in evening out the waste water inflow to soil-based waste water purification installations.

Figure 2:
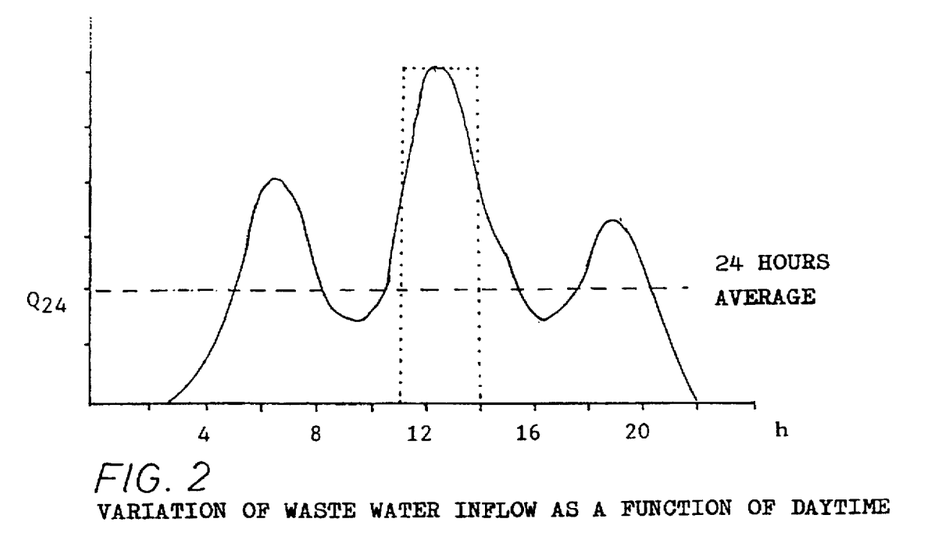
FIG. 2 is a typical daily variation in waste water inflow, the 24-hours average, and the evening-out action of a typical peristaltic pump.

It has already been attempted to even out the waste water inflow via the mechanical stage which precedes the purifying installation and which may be constructed as a single-chamber or multi-chamber man hole or septic tank. For this purpose, a pump is installed which converts the waste water inflow into a different mode of flow and passes this flow on to the purifying installation. This pump mode depends upon the type of the deployed pump and its feed characteristic. In the case of the most frequently used level-controlled submerged pump or single-channel gear pump there is obtained an inflow of the type as illustrated in the diagram of FIG. 2. It will be seen therefrom that a certain evening-out effect is attained thereby but that during the pump action much more waste water than the amount for which the purifying installation has been dimensioned, is passed to the purifying installation. When the pump is unfavourably selected and adjusted, the inflow during the pump action may be greater by a factor higher than 40 as compared to the daily average with respect to which the purifying installation has been constructed originally. Consequently, there is achieved essentially the opposite of what was technically intended. Somewhat acceptable conditions, therefore, can only be realized by most diligently selecting the pump to be employed and, above all, by selecting a narrow range of level control.

It is for these reasons that attempts have also been made to attain the evening-out of the inflow by using continuously operating pumps, for example, eccentric spiral pumps or peristaltic pumps. These solutions have not prevailed mainly for two reasons:

(1) pumps of these types are relatively expensive and not particularly suitable for continuous operation;

(2) these pumps require continual readjustment as a function of the state of development of the purifying installation and its weather-dependent hydraulic throughput capacity.

In correspondence with the foregoing discussion, it will be seen that there still exists the object of providing, in a purifying installation and a purifying method of the initially mentioned type, means for effectively operating the installation and carrying out the method in a manner which is substantially independent of variations in the waste water inflow.

According to the invention, this object is achieved by flow control means which constitute inflow control means associated with the inlet for substantially evening out variations existing in the waste water inflow received by the inlet, the inflow control means controlling the waste water inflow in direct dependence upon the hydraulic throughput capacity of the soil-based filter bed.

In accordance with the inventive method, this object is achieved by controlling the waste water inflow into the inlet in direct dependence upon the hydraulic throughput capacity of the soil-based filter bed in order to thereby substantially even out variations in the waste water inflow.

Consequently, the invention solves the aforementioned problem by relying upon controlling the inflow of waste water in correspondence with the hydraulic throughput capacity of the soil-based filter bed in a manner such that the inflow does not exceed the hydraulic throughput capacity of the soil-based filter bed and, as a consequence, there is no longer required continuously running and controlling pumps which continuously feed waste water to the inlet, nor the danger that considerable amounts of excess waste water run along the top surface of the soil-based filter bed and thereby escape purification.

These objects are advantageously achieved by providing buffer means which are connected to said inlet for receiving excess waste water exceeding said hydraulic throughput capacity of the soil-based filter bed.

In one exemplary embodiment of the invention, the buffer means comprise a buffer reservoir, pump means operatively associated with said buffer reservoir, an infeed conduit leading from said pump to said inlet, and return means leading from said inlet to said buffer reservoir, the return means returning excess waste water, which exceeds the hydraulic throughput capacity of the soil-based filter bed, from the inlet to the buffer reservoir. Preferably, the return means comprise an overflow tube having a receiving end which is positioned at or adjusted to the level of the top surface of said soil-based filter bed. In this manner, it will be achieved that any excess waste water which reaches the inlet, is passed to the buffer reservoir and the pump means are operated only as long as the waste water exceeds a predetermined level in the buffer reservoir while the excess waste water is very effectively prevented from running along the top surface of the soil-based filter bed.

In another exemplary embodiment of the invention, the buffer means constitute contact buffer means of predetermined dimensions. The contact buffer means communicate with the inlet and are arranged in immediate flow-communicating contact with the soil-based filter bed through said inlet. In this manner, the contact buffer means can be dimensioned in adaptation to the expected waste water inflow and thus ensure continuous delivery of the arriving waste water to the soil-based filter bed in an amount which precludes the occurrence of excess waste water which would run along the top surface of the soil-based filter bed. At the same time, the deployment of controlled pumps can be dispensed with as far as the inflow control is concerned.

Exemplary embodiments of the invention are illustrated in the accompanying drawings and will be described in more detail hereinbelow in conjunction with the given reference characters. In the drawings.

In the drawing of FIG. 1, there is shown in longitudinal section a prior art soil-based filter bed 1 provided with an inlet 2 and an outlet 3. The inlet 2 basically constitutes a gravel-filled ditch which is placed at the front or inflow side of the soil-based filter bed 1 and which communicates with the front or inflow side of the active filter bed 1. A waste water infeed line or conduit 4 feeds waste water to the inlet 2, either due to gravity or by means of a pump. Since the soil-based filter bed 1 as shown in FIG. 1 is prior art and since all the details thereof are also known in the art, this construction is not shown and explained in greater detail but is merely intended to generally illustrate the state of the art.

FIG. 2 represents a diagram showing the typical variation of domestic waste water inflow as a function of daytime through the infeed line or conduit 4. As explained hereinabove on page 3, the waste water inflow shows considerable variation during the day and this will be particularly evident when comparing the maxima and minima with the 24-hours average $Q_{24}$ which is shown as a dashed line. The dotted line in FIG. 2 around noon time indicates the degree of evening-out which can be achieved when employing a peristaltic pump during this time. It will also be evident from this drawing that extensive and detailed control of the pump will be required in order to achieve at least some evening-out but that pumping alone probably will be insufficient for this purpose.

Figure 3:
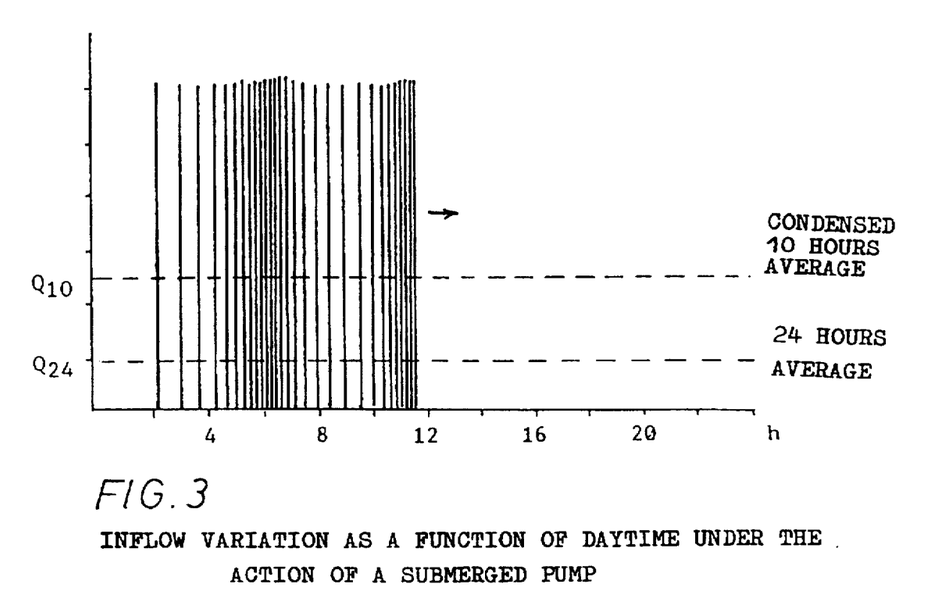
FIG. 3 shows the action of a submerged pump on the waste water inflow, the 24-hours average, and the corresponding condensed 10-hours average.

The drawing of FIG. 3 shows the evening-out effect which can be achieved in the inlet 2 of the soil-based filter bed 1 as shown in FIG. 1, when a submerged pump is used instead of the peristaltic pump. Also indicated by dashed lines in this drawing are the aforementioned 24-hours average $Q_{24}$ as well as the corresponding condensed 10-hours average $Q_{10}$. The pump action frequency is seen to increase with the amount of inflowing waste water and, particularly, each pump action will produce an inflow which is significantly increased above the averages. Consequently, the selection of a submerged pump will not solve the problems occurring when peristaltic pumps are employed.

Figure 4:
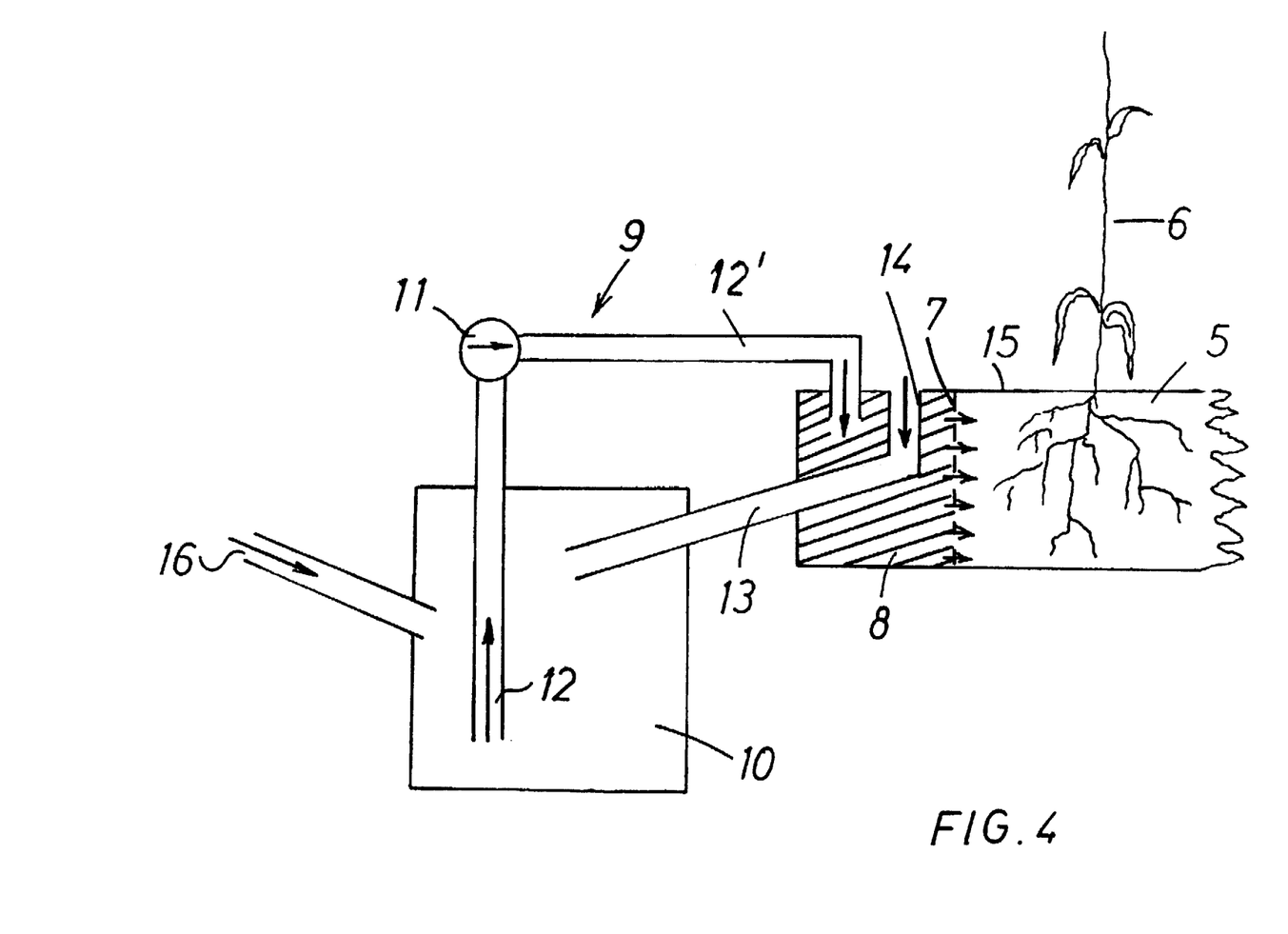
FIG. 4 is a schematic illustration of a first exemplary embodiment of the inventive waste water inflow control means in combination with a soil-based, plant-containing filter bed.

FIG. 4 shows a first exemplary embodiment of the inventive waste water inflow control means 9 used in conjunction with a soil-based filter bed. The soil-based filter bed is seen to constitute a plant-containing filter bed 5 planted with, for example, reed plants 6. It should be noted, however, that various designations are known in the art for such filter beds, such as root space installation, plant installation, plant-containing solid bed reactor, marsh bed installation, constructed wetlands etc. The filter bed 5 defines a front or inflow side 7 which is in flow communication with an inlet 8. The inlet 8 may constitute a gravel-filled ditch or the like.

The inflow control means 9 comprise a buffer reservoir 10 and pump means 11,12 operatively associated therewith. The buffer reservoir 10 may be in the form of, for example, a pump well of the pump means 11,12, a settling pond, a multi-chamber man hole or septic tank or the like. The pump means 11,12 may constitute e.g. a conventional level-controlled pump 11 and a suction line or conduit 12 which extends from the pump 11 into the interior of the buffer reservoir 10. The suction line or conduit 12 is connected through the pump 11 to an infeed line or conduit 12' which opens into the inlet 8. Return means 13, 14 in the form of combined overflow and return means are provided in the inlet 8 and include a return line or conduit 13 which leads from the inlet 8 to the buffer reservoir 10. The return line or conduit 13 is equipped with an overflow tube 14 having a receiving end which opens, in the illustrated example, at a level which is flush with the top surface 15 defined by the soil-based filter bed 5. The buffer reservoir 10 is also connected to a waste water inflow line or conduit 16.

In operation, waste water is infed into the inlet 8 through the infeed line or conduit 12 under the action of the pump 11 once the waste water in the buffer reservoir 10 rises above a predetermined level preadjusted at the level-controlled pump 11. The level of the infed waste water reached in the inlet 8 is limited by means of the overflow tube 14 and its receiving end to the level which is defined by the top surface 15 of the soil-based filter bed 5. Any excess waste water, which exceeds the hydraulic throughput capacity of the soil-based filter bed 5, thus will be returned to the buffer reservoir 10 through the overflow tube 14 and the return line or conduit 13. The waste water infed into the inlet 8 is thereby very effectively prevented from flowing along the top surface 15 of the soil-based filter bed 5.

Figure 5:
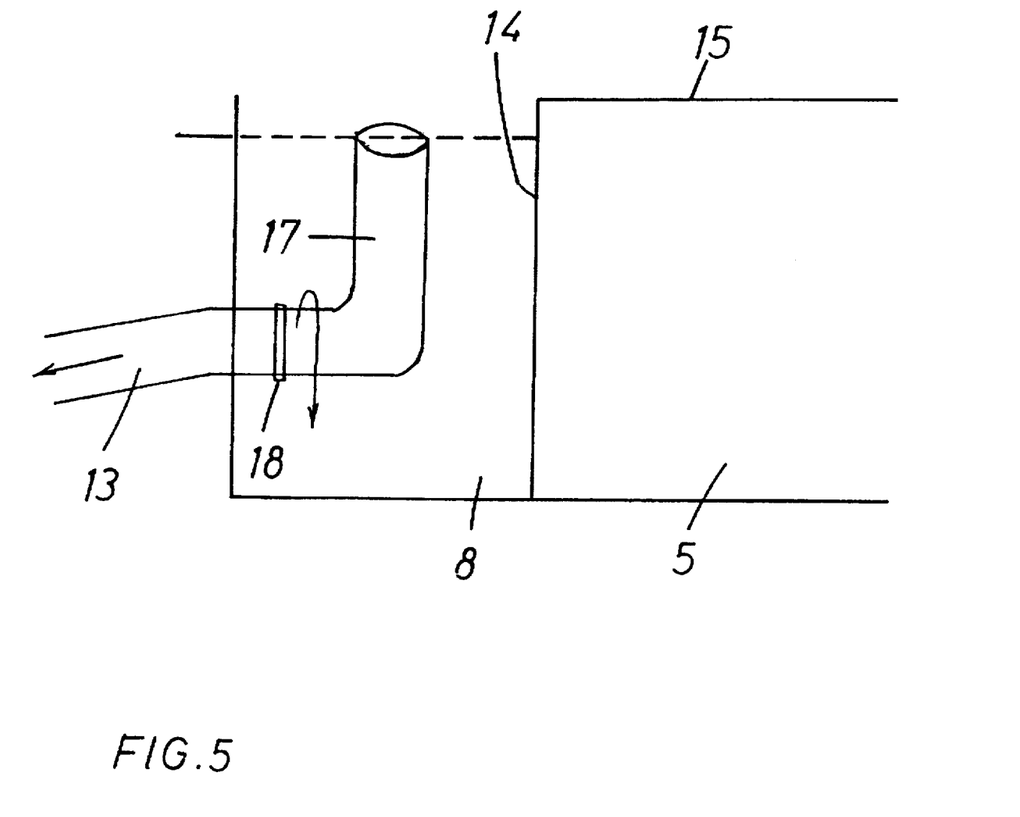
FIG. 5 is a schematic view of return means employed in conjunction with the waste water inflow control means as shown in FIG. 4.

In order to provide greater versatility to the system, means may be provided to vary the level at which infed waste water is returned from the inlet 8 to the buffer reservoir 10. A possible realization of such means is illustrated in FIG. 5 as a matter of example. Therein, the overflow tube is formed by a tube bend 17 which is connected to the return line or conduit 13 by means of a sealed pivot connection 18 of usual construction. When the tube bend 17 is pivoted from the illustrated vertical position in the direction as indicated by the arrow, the level at which the return flow is started through the tube bend 17 will be lowered so that less waste water will be admitted to the soil-based filter bed 5 through its front or inflow side.

It will be evident that some degree of balance can be achieved in the system due to these measures. The reason therefore is that the relation between the amount of waste water entering the soil-based filter bed 5 and the amount of waste water returned to the buffer reservoir 10 is not only made dependent upon the waste water inflow and the operating mode of the pump 11 on the input side but is also defined by the prevailing hydraulic throughput capacity of the soil-based filter bed 5 on the receiving side. There is thus formed a feed-back circuit which attains the intended technical object by reducing the waste water inflow fluctuations to a considerable extent.

More precisely, the aforementioned feedback circuit is formed due to the fact that the inlet 8 is in immediate flow communication with the receiving soil-based filter bed 5.

However, the aforedescribed exemplary embodiment has been found in practice to suffer a significant technical deficiency: The pump 11 which is employed in most of such installations, is formed by a discontinuously operating pump. Due to the return flow from the inlet 8, the operating frequency of the pump is significantly increased so that a much more condensed energizing program is imposed onto the pump which not only results in higher operating loads and wear on the pump but additionally in undesired, significantly higher energy consumption.

Figure 8:
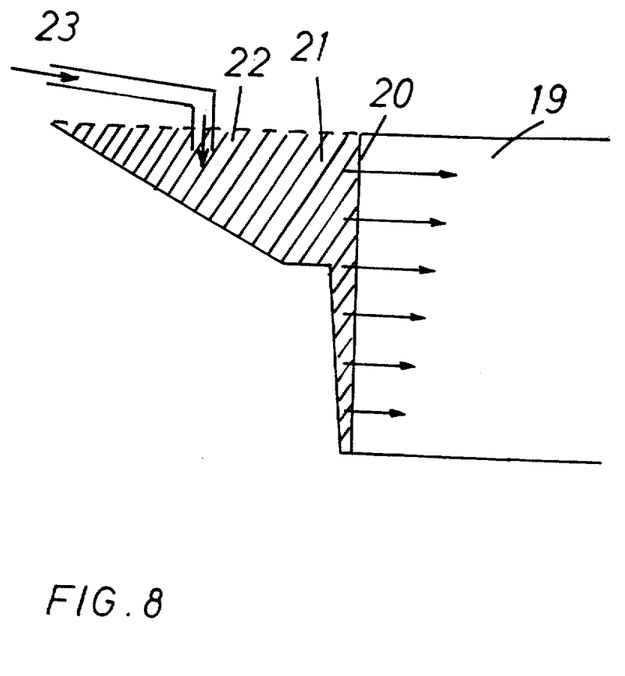
FIG. 8 is a schematic illustration of a second exemplary embodiment of the inventive waste water inflow control means in conjunction with a soil-based filter bed.
Figure 9A:
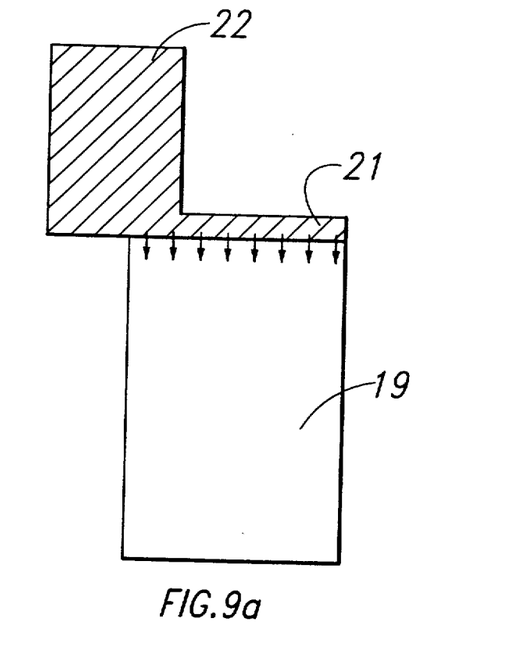
FIGS. 9a and 9b show top plan views of respective different modes of realization of the waste water inflow control means as shown in FIG. 8.
Figure 9B:
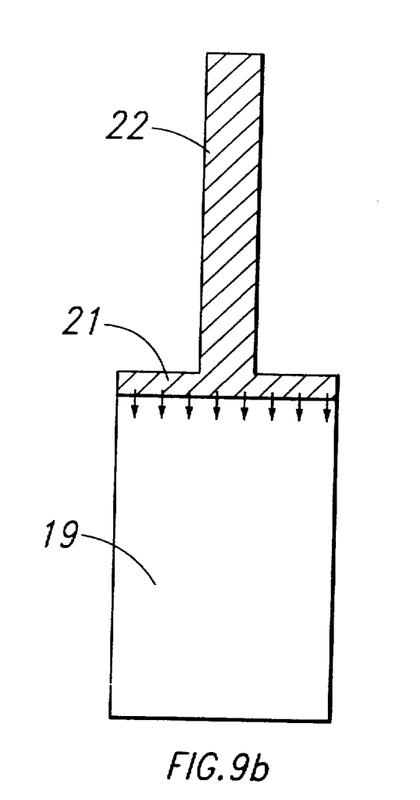
Figure 10:
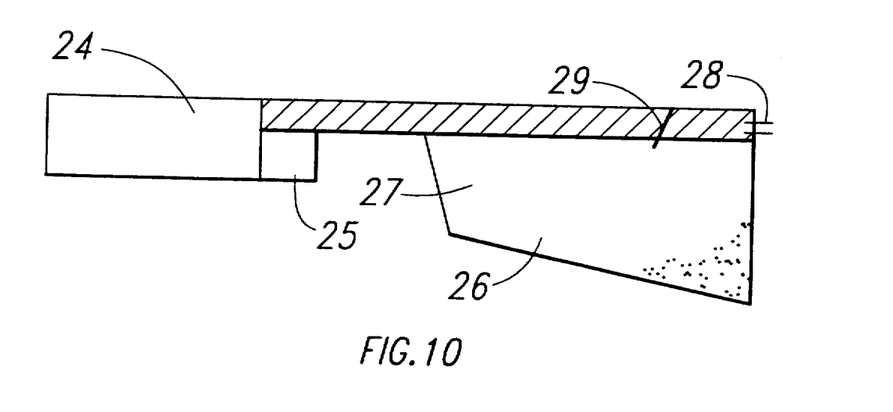
FIG. 10 is a longitudinal section through a further realization of the waste water inflow control means as shown in FIG. 8.

A second exemplary embodiment of the inventive waste water inflow control means which is not subject to the aforementioned deficiency, is illustrated in FIGS. 8 to 10 and will now be described. For better understanding of the distinctive features of this embodiment, a more detailed discussion of the mode of operation and the structure of the soil-based filter bed appears to be called for.

In the conventional technical arrangement of a horizontally throughpassed plant-containing filter bed of the type as illustrated in FIG. 4, a horizontal inflow of waste water enters the soil body of the filter bed 5 from the inlet 8 through the front or inflow side 7. The water flow through the soil body is effected by means of the hydraulic gradient in the direction towards a lower-lying outlet like the outlet 4 shown in FIG. 1. This arrangement as well as the rules for dimensioning such installations are described by R. Kickuth in a publication entitled "Einige Dimensionierungsgrundsätze für das Wurzelraumverfahren" (Some Dimensioning Principles for the RootSpace Method) in "Hamburger Berichte zur Siedlungswasserwirtschaft" Vol. 1, pp. 29–38, published 1983.

Consequently, the inlet 8 is in immediate flow-communicating contact with the cross-sectional surface defined by the front or inflow side 7 of the active soil body. The inlet 8 thus is continuously drained by means of the soil body and continuously refilled by the waste water inflow. The buffering power of the inlet 8 for buffering non-uniform waste water inflows, however, is extraordinary limited which has been fully recognized only recently. In fact, the drain dynamics of such contact inlet hitherto has found only little attention and some of the essential factors affecting the drain dynamics are still unknown.

As a result of non-uniform waste water inflows or waste water level changes in the inlet 8 due to variations in the waste water outflow, the relationship $$Q = F \times k_F \times dH/dS$$

is subject to change. Therein are

Q the throughput through the installation in m³/sec,

F the infiltration cross-section in m², i.e. the area of contact defined between the contact inlet 8 and the active soil body, $k_F$ the permeability coefficient of the soil body in m/sec, dH/dS the hydraulic gradient between the waste water level in front of the contact area F and the outlet level.

It will be immediately evident from the above relationship that the throughflow through the installation will change more than just proportional to a change in the waste water level in front of the contact area F. This is due to the fact that not only the liquid contact area F but additionally also the hydraulic gradient dH/dS is affected by a change in the waste water level in the inlet 8. This already will explain that the drain and refill processes which occur in the inlet 8 and which are available for a buffering action, are bounded by very close limits and are practically restricted to the highest waste water levels in the inlet 8.

When further taking into account that the inlet ditches are gravel-filled in most of the cases, it will be readily seen that such gravel-filled inlet ditch of root space filter beds like the soil-based filter bed 5 is practically unsuited for performing buffering functions.

In reality, the conditions are even more extreme in view of more recent investigations showing that the hydraulic throughput capacity Q or the hydraulic conductivity of the active soil body as expressed by the permeability coefficient $k_F$, is dependent on the depth below the surface 15 or planum. The result of these investigations is illustrated by the diagram shown in FIG. 6 wherein the permeability coefficient $k_F$ is plotted as a function of depth below planum, the depth of 0.6 meters representing the limiting depth to which the soil body or matrix usually extends.

Figure 6:
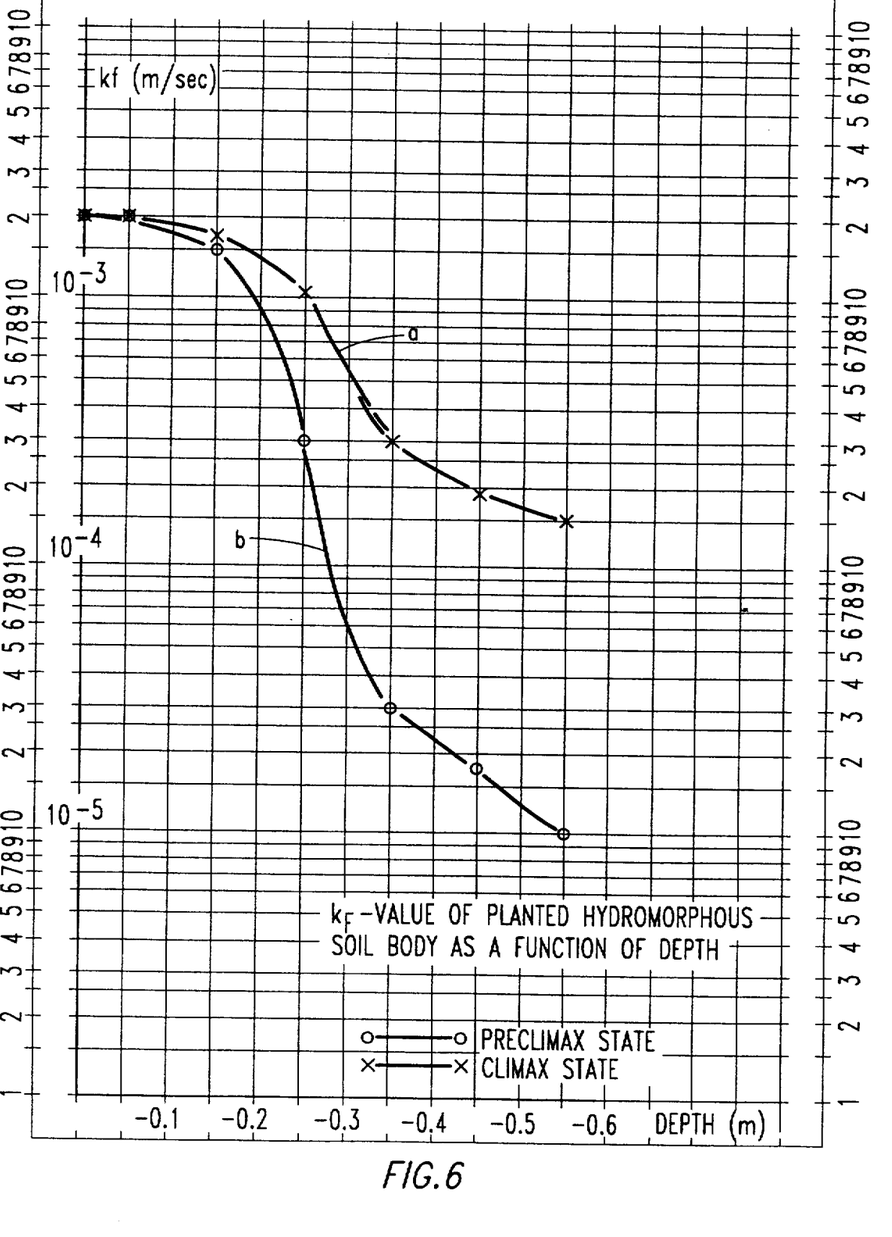
FIG. 6 is a diagram showing the variation of the hydraulic permeability coefficient of a soil-based filter bed as a function of depth and development.

The curve marked "a" is based on measured $k_F$ values shown in crosses, and relates to a fully developed soil body or matrix, i.e. a fully hydromorphous soil body or matrix in the fully developed state of the plants 6 (climax state) which is reached approximately 4 years after starting the operation. It will be recognized from the data points that the permeability coefficient $k_F$ varies by more than an order of magnitude with increasing depth below planum.

The curve marked "b" is based on measured $k_F$ values shown by circles, and relates to a not yet fully developed soil body or matrix, i.e. a not yet fully hydromorphous soil body or matrix in the not yet fully developed state of the plants 6 (preclimax state) which is reached approximately half a year after starting the operation. It will be recognized from the data points that in this case the permeability coefficient $k_F$ varies by more than two orders of magnitude with increasing depth below planum. It will have to be taken into account that the purifying power of such installation is lower than that of the soil-based filter bed 5 containing fully developed plants 6.

In the following Table I, the parameters are given of individual soil layers like the $k_F$ value, the standard cross-section and the specific hydraulic gradient. The throughput capacities of such layers which result from these parameters, are given in line VIII of Table I and defined by the drain rate through the respective layers from an inlet or inlet ditch which is in direct flow communication with the soil body or matrix. The numbers given in Table I relate to a standard installation having an infiltration width of 1 meter, an infiltration length of 10 meters and an operating depth of 0.6 meters. The relative outflow is given in per cent of the outflow from the top layer which represents 100% outflow.

TABLE I

| | | Drain of a Contact Buffer Placed in Front of a Root Space Installation | | |
|---|---|---|---|---|
| I | Depth of layer, m | 0,0–0,1 | 0,1–0,2 | 0,2–0,3 |
| II | Reference depth level, m | 0,05 | 0,15 | 0,25 |
| III | Contact cross-section, m$^2$ | 0,55 | 0,45 | 0,35 |
| IV | Hydraulic gradient, dH/dS | 0,055 | 0,045 | 0,035 |
| V | Layer $k_F$, m/sec | $20 \cdot 10^{-4}$ | $16 \cdot 10^{-4}$ | $11 \cdot 10^{-4}$ |
| VI | Drain $k_F$, m/sec | $8.9 \cdot 10^{-4}$ | $6.68 \cdot 10^{-4}$ | $4.35 \cdot 10^{-4}$ |
| VII | Drain rate, m/sec | $0.49 \cdot 10^{-4}$ | $0.3 \cdot 10^{-4}$ | $0.15 \cdot 10^{-4}$ |

TABLE I-continued

| | | Drain of a Contact Buffer Placed in Front of a Root Space Installation | | |
|---|---|---|---|---|
| VIII | Drain volume, m$^3$/sec | $26.9 \cdot 10^{-6}$ | $13.5 \cdot 10^{-6}$ | $5.2 \cdot 10^{-6}$ |
| IX | Relative outflow, % | 100 | 50.2 | 19.3 |
| I | Depth of layer, m | 0,3–0,4 | 0,4–0,5 | 0,5–0,6 |
| II | Reference depth level, m | 0,35 | 0,45 | 0,55 |
| III | Contact cross-section, m$^2$ | 0,25 | 0,15 | 0,05 |
| IV | Hydraulic gradient, dH/dS | 0,025 | 0,015 | 0,005 |
| V | Layer $k_F$, m/sec | $3 \cdot 10^{-4}$ | $1.9 \cdot 10^{-4}$ | $1.5 \cdot 10^{-4}$ |
| VI | Drain $k_F$, m/sec | $2.13 \cdot 10^{-4}$ | $1.7 \cdot 10^{-4}$ | $1.5 \cdot 10^{-4}$ |
| VII | Drain rate, m/sec | $5.3 \cdot 10^{-6}$ | $2.55 \cdot 10^{-6}$ | $0.75 \cdot 10^{-6}$ |
| VIII | Drain volume, m$^3$/sec | $1.34 \cdot 10^{-6}$ | $0.38 \cdot 10^{-6}$ | $0.038 \cdot 10^{-6}$ |
| IX | Relative outflow, % | 4.98 | 1.4 | 0.14 |

Figure 7:
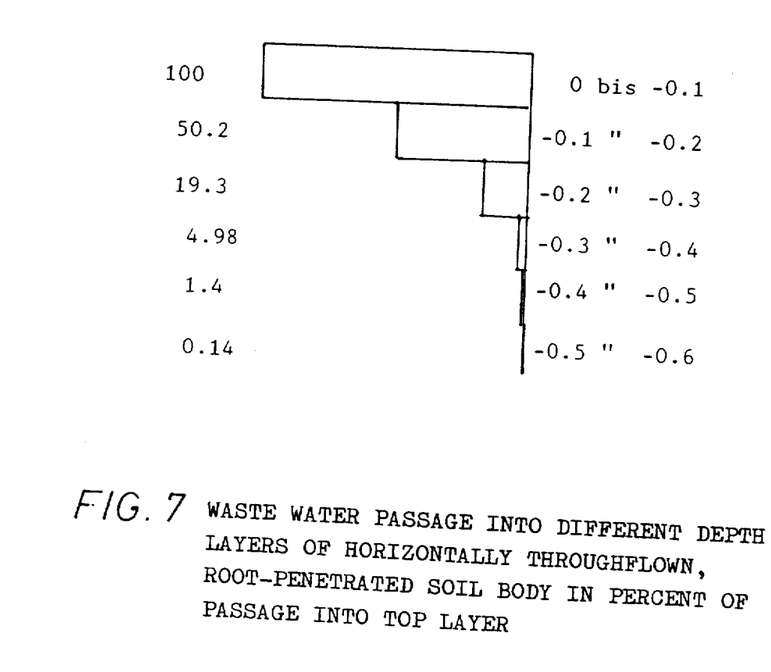
FIG. 7 is a diagram showing the throughput capacity of different layers of a soil-based filter bed.

The contents of lines I and IX of Table I is pictorially represented in the diagram shown in FIG. 7. From this diagram as well as from the contents of Table I it will be evident that only the upper section extending to a depth of 0.2 to 0.3 meters of the soil body or matrix has a throughput capacity rendering a throughput or rate of throughflow which can be utililized for buffering purposes.

Furthermore, it will be recognized from FIG. 1 of the drawings, the numbers given in Table I and their representation in FIG. 7 that the conventional inlet 2 of trapezoidal cross-section as shown in FIG. 1 is unsuitable to perform any noteworthy buffering function. This is due to the fact that the upper section of such inlet or inlet ditch 2 offers only a fairly limited drain/refill volume which would be totally inadequate for the aforementioned high throughput capacity of the adjoining upper layers of the soil body or matrix. Still further, while the inlet or inlet ditch 2 has a lower section of comparatively large volume, this volume is rendered totally useless for a buffering action in view of the minimum throughput capacity of the adjoining lower layers of the soil body or matrix.

The second exemplary embodiment of the inventive inflow control means as shown in FIGS. 8 to 10 of the drawings, is based on the aforediscussed findings. This embodiment comprises a soil-based filter bed 19 of the aforementioned type having a front or inflow side 20 which is in flow communication with an inlet 21 which is combined with a contact buffer 22. This contact buffer 22 is in direct flow communication with the front or inflow side 20 of the soil-based filter bed 19. A waste water infeed line or conduit 23 feeds waste water to the contact buffer 22. The contact buffer 22 is constructed with a configuration which ensures that its filling volume is precisely adapted to the throughput capacity of the upper section or layers of the soil-based filter bed 19. In this manner, the contact buffer 22 is dimensioned sufficiently so as to provide an effective buffer volume for draining and receiving waste water and for effectively evening out variations in the waste water inflow. This buffering action is rendered possible because the capacity of the contact buffer 22 varies in correspondence with the variation in the throughput capacity of the upper section or layers of the soil-based filter bed 19 with which the contact buffer is in flow communication through the inlet 21. Consequently, the buffer volume presented by the contact buffer 22 decreases with increasing depth of the contact buffer 22.

The actual configuration of the contact buffer 22 will be selected in accordance with local building conditions; two of the most various possible shapes and arrangements are illustrated in top plan view in FIGS. 9a and 9b. While it is without consequences whether the contact buffer 22 has a larger, smaller or equal width as compared to the infiltration width of the associated soil-based filter bed 19, it will be self-evident that it must be ensured that the contact buffer 22 is in flow communicating contact with the entire width of the soil body or matrix since this width is dimensioned in adaption to the purification demands of each particular installation.

Another possible variation of a contact buffer is shown in FIG. 10 in diagrammatic cross-section. In this particular case, the soil-based filter bed 24 and its inlet 25 are preceded by a settling pond or stage 26 which is separated from the inlet 25 by means of an overflow bar 27. The height of the overflow bar 27 is selected such that the settling pond or stage 26 is in flow communicating contact with the upper section or layers of high throughput capacity in the soil-based filter bed 24 through the inlet 25. In this manner, the settling pond or stage 26 is constructed to effectively constitute the desired contact buffer. Care is taken by arranging and constructing the waste water infeed 28 to the settling pond or contact buffer 26 in a manner such as to safely prevent any direct flow connection between the waste water infeed 28 and the inlet 25. As shown, a baffle 29 is provided for deflecting the incoming waste water infeed away from the inlet 25. In this manner it will be ensured that no sediment which may be contained in the waste water infeed, can be carried to and colmate the front or infiltration surface of the active soil body or matrix.

The invention and advantageous further developments will be further explained by the following detailed Examples.

EXAMPLE 1

The following example relates to a soil-based filter bed like the soil-based filter bed 19 as shown in FIG. 8 and is intended to demonstrate the construction and mode of operation of a contact buffer 22 which is in flow communication with the soil-based filter bed 19 through the inlet 21.

The installation is provided for a two-family house having a total of 10 occupants.

The produced waste water is 0.2 m³ per day and occupant so that the total produced waste water is 2 m³ per day.

The waste load in $BOD_5$ following the settling ditch is 0.048 kg per day and occupant; this will add up to a total of 0.48 kg $BOD_5$ per day.

The infeed concentration thus amounts to 240 mg/l $BOD_5$.

The required outfeed concentration is 20 mg/l $BOD_5$.

The required installation surface area is 30 m² at an operating depth of 0.6 m.

The selected surface configuration is W=4 m, L=7.5 m.

The adjusted hydraulic throughput capacity is 0.096·10-3 m³/sec at $k_f$=5·10⁻⁴ m/sec.

The average daily outfeed from the two-family house amounts to 0.023·10⁻³ m³/sec.

Consequently, the installation is sufficiently dimensioned in view of the fourfold excess above the average daily outfeed.

However, the installation is insufficiently dimensioned for handling extreme events. As such extreme event, there is considered the simultaneous emptying of two bath tubs each of which contains a volume of 280 l of waste water and which are emptied within 320 seconds. The thus produced outfeed amounts to 1.75·10⁻³ m³/sec and thus to a 76-fold excess above the daily average.

The outflow from the installation during the time of the extreme event amounts to only 3.07 l and, therefore, may remain unconsidered.

The object thus is to provide a buffer capacity sufficient for the inflow of 560 of waste water during 320 seconds. This purpose is served by a contact buffer 22 extending across the entire installation width of 4 m, having a depth of 0.2 m and extending to the rear by 0.7 m. The contact buffer 22 is stabilized by means of a 16/32 gravel fill which results in an increase in the rearward length to 1.4 m.

The effect of this contact buffer 22 is cross-checked by the following consideration:

Since the throughput capacity of the installation amounts to 0.096·10⁻³ m³/sec, the time for passing 0.56 m³ therethrough will be 5833 seconds or 1.62 hours. This is a relatively very short time which, in fact, is not really needed for regeneration of the contact buffer 22 but is the result of selecting, due to the particular building conditions, a width which considerably exceeds the width which would have been hydraulically required in view of the average outflow.

EXAMPLE 2

This example relates to a waste water purifying installation for waste water issuing from a meat processing plant.

The average daily waste water volume is 40 m³.

The average outflow thus amounts to 4.86·10⁻⁴ m³/sec.

The average waste content is 850 mg/l $BOD_5$.

The required outfeed concentration is 25 mg/l $BOD_5$.

The installation is a root space installation dimensioned in accordance with a publication entitled "Einige Dimensionierungsgrundsätze für das Wurzelraumverfahren" (Some Dimensioning Principles Concerning the Root Space Method) by R. Kickuth in "Wissenschaftliche Grundlagen der Abwasserreinigung" (Scientic Basis of Waste Water Purification), pp. 29 to 47, Springer Verlag 1982.

Accordingly, the required soil body surface area is 772 m².

At $k_f$=5·10⁻⁴ m/sec, the required hydraulic cross-sectional area F is 16.2 m² at an activatable hydraulic gradient of 0.06 and operating depth of 0.6 m.

The waste water outflow through Monday, Tuesday, Wednesday and Thursday amounts to 40 m³ per day and is distributed through each day as follows:

0 m³ through 16 hours, 20 m³ through 6 hours amounting to 9.26·10⁻⁴ m³/sec, and 20 m³ through 2 hours amounting to 2.78·10⁻³ m³/sec.

The waste water outflow through Friday amounts to 130 m³ and is distributed as follows:

0 m³ through 16 hours, 20 m³ through 6 hours amounting to 9.26·10⁻⁴ m³/sec, and 110 m³ through 2 hours amounting to 1.53·10⁻² m³/sec.

The total waste water outflow through Saturday and Sunday amounts to 4 m³ and, therefore, remains unconsidered.

a) Installation for operation with the exception of Friday:

A contact buffer having a width of 27 m, a depth of 0.2 m and a length of 6.15 m is constructed like the contact buffer 22 in FIG. 8 and has a volume capacity of 33 m$^3$.

The average daily outflow from such contact buffer amounts to $20.2 \cdot 10^{-6}$ m$^3$/sec per m of installation width or, at a total width of 27 m, 47.12 m$^3$ per day.

The critical waste water inflow is the inflow of 20 m$^3$ during 2 hours. Calculating the inflow and outflow, the following numbers are obtained:

Inflow for 16 hours: 0.00 m$^3$; Outflow for 16 hours: 31.41 m$^3$;
Inflow for 6 hours: 20.00 m$^3$; Outflow for 6 hours: 11.78 m$^3$;
Inflow for 2 hours: 20.00 m$^3$; Outflow for 2 hours: 3.93 m$^3$.

In summary, it will be seen that the entire daily inflow does not exceed the entire daily outflow at any time and the total contact buffer volume of 33 m$^3$ is not exceeded by the waste water inflow at any time.

Consequently, the proposed contact buffer of the aforementioned dimensions is fully sufficient for handling the waste water inflow on all days of the week with the exception of Friday which has the extraordinary peak waste water inflow of 110 m$^3$ during two hours.

b) Alternative installation for operation with the exception of Friday:

The soil-based filter bed as before is provided with a buffer reservoir in the form of a settling pond having lateral dimensions of 5 m×8 m resulting in a cross-sectional area of 40 m$^2$. The settling pond serves as a pump well having a depth of 2 m. A level-controlled pump is installed in this pump well; the pump has an output of 5 l/sec and is designed to be operated when the level rises 0.10 m above a predetermined level. As illustrated in FIG. 4, the pump output side is connected to an infeed line or conduit 12 for infeeding pumped waste water into the inlet of the soil-based filter bed 5. A return line 13 leads from the inlet 8 to the buffer reservoir 10 and returns any excess waste water inflow to the buffer reservoir 10.

The level-controlled pump is operated according to the following program:

During the 6 hours of 20 m$^3$ waste water inflow, the pump performs 5 cycles of operation. During each cycle, the pump is operative for about 800 seconds to pump 4 m$^3$ of waste water into the inlet and the pump is inoperative for about 3500 seconds. During the 2 hours of 20 m$^3$ waste water inflow, the pump again performs 5 cycles of operation. During each cycle, the pump is operative for about 800 seconds and likewise pumps 4 m$^3$ of waste water into the inlet and the pump is inoperative for about 640 seconds.

Like in the installation containing the contact buffer as described hereinabove sub a), the entire daily inflow does not exceed the entire daily outflow at any time and the total outflow volume of about 47.12 m$^3$ is not exceeded by the waste water inflow at any time.

Consequently, the proposed buffer reservoir is fully sufficient for handling the waste water inflow on all days of the week with the exception of Friday which has the extraordinary peak waste water inflow of 110 m$^3$ during two hours.

c) Installation for operation with the inclusion of Friday:

The installation according to a) hereinabove included a contact buffer of the dimensions 27 m×0.2 m×6.15 m. In order to provide a contact buffer which would be suitable for handling the 110 m$^3$ peak waste water inflow for 2 hours, the contact buffer would have to be redimensioned to have a width of 27 m, a depth of 0.2 m, and a length of 19.63 m. When considering that the contact buffer will be provided with a gravel filling which would halve its capacity, the length will have to be increased to 39.26 m. There would thus result a contact buffer defining a surface area of 1060 m$^2$ which would be significantly larger than that of the actual soil-based filter bed (which has a surface area of 772 m$^2$). After all, although such contact buffer would be emptied to the depth of 0.2 m during weekends and thus would be available for handling all of the waste water inflow occurring during the following week, the construction of such relatively shallow contact basin of the aforementioned dimensions would present serious problems.

Therefore, a combination of the contact buffer as described hereinabove sub a) and the buffer reservoir as described hereinabove sub b) is used in order to overcome the extremely variable waste water inflows presented by the meat processing plant on Fridays.

The infeed conduit, which extends from the pump associated with the buffer reservoir, opens into the contact buffer, while the return line leads from the contact buffer to the buffer reservoir. The waste water inflow from Monday through Thursday can be handled by the contact buffer alone and, consequently, the buffer reservoir and pump will be out of operation during these days. Of the 130 m$^3$ waste water inflowing during Friday, only 33 m$^3$ can be handled by the contact buffer. The remaining 97 m$^3$ are diminished by 15.7 m$^3$ which pass through the soil-based filter bed during 8 hours; the final remainder of 81.3 m$^3$ must be taken up by the buffer reservoir and pump. Therefore, during Friday and the weekend, a total of about 4.5 hours pump work are required and appropriately programmed in the pump control.

I claim:

1. Flow control means associated with a soil-based waste water purifying installation containing a soil-based filter bed, which has a predetermined hydraulic throughput capacity and through which waste water is passed for purification, and further containing an inlet receiving a waste water inflow to be purified and communicating with the soil-based filter bed, said flow control means comprising:

inflow control means associated with the inlet for substantially evening out variations existing in the waste water inflow received by said inlet, said inflow control means controlling said waste water inflow in direct dependence upon the hydraulic throughput capacity of the soil-based filter bed; and buffer means connected to said inlet for taking up excess waste water exceeding the hydraulic throughput capacity of the soil-based filter bed, said buffer means comprising:

a buffer reservoir;

a pump operatively associated with said buffer reservoir;

an infeed control leading from said pump to said inlet; and return means, leading from said inlet to said buffer reservoir, for returning excess waste water, which exceeds the hydraulic throughput capacity of the soil-based filter bed, from said inlet to said buffer reservoir.

2. Flow control means according to claim 1, wherein the pump comprises a pump well and the buffer reservoir is selected from the group consisting of said pump well, a settling pond, a single chamber and a multi-chamber man hole or septic tank.

3. Flow control means according to claim 1, wherein the return means comprise combined overflow and return means arranged in said inlet for preventing excess waste water from flowing along the top surface of the soil-based filter bed.

4. Flow control means according to claim 3, wherein the soil-based filter bed defines a top surface and wherein the combined overflow and return means comprise an overflow tube having a receiving end which is positioned at the level of said top surface of said soil-based filter bed.

5. Flow control means according to claim 3, wherein the soil-based filter bed defines a top surface and wherein the combined overflow and return means comprise an overflow tube having a receiving end which is adjustable relative to the level of said top surface of said soil-based filter bed.

6. Flow control means according to claim 5, wherein the overflow tube is formed by a tube bend pivotably attached to the return means for pivotable adjustment of the receiving end relative to the level of the top surface of the soil-based filter bed.

7. Flow control means associated with a soil-based waste water purifying installation containing a soil-based filter bed, which has a predetermined hydraulic throughput capacity and through which waste water is passed for purification, and further containing an inlet receiving a waste water inflow to be purified and communicating with the soil-based filter bed, said flow control means comprising:

inflow control means associated with the inlet for substantially evening out variations existing in the waste water inflow received by said inlet, said inflow control means controlling said waste water inflow in direct dependence upon the hydraulic throughput capacity of the soil-based filter bed; and buffer means connected to the inlet for taking up excess waste water exceeding the hydraulic throughput capacity of the soil-based filter bed, wherein said buffer means comprise contact buffer means of predetermined dimensions, said contact buffer means being combined with the inlet and arranged in immediate flow communicating contact with the soil-based filter bed through said inlet;

wherein, the soil-based filter bed comprises an upper section which has substantially higher hydraulic throughput capacity as compared to a lower section of said soil-based filter bed and said contact buffer is arranged in direct flow communication with said upper section of the soil-based filter bed.

8. Flow control means according to claim 7, wherein the contact buffer is of a configuration defining a variable cross-sectional area which varies from the bottom to the top in correspondence with the throughput capacity of the upper section of the soil-based filter bed with which upper section said variable cross-sectional area is in direct flow communicating contact.

9. Flow control means according to claim 8, wherein the contact buffer has a maximum depth of 0.3 meters below the top surface of the soil-based filter bed.

10. Method of controlling the flow of waste water in a soil-based waste water purifying installation wherein a waste water inflow is infed into an inlet and passed from the inlet through a soil-based filter bed having a predetermined hydraulic throughput capacity, said method comprising the steps of:

controlling the waste water inflow into the inlet in direct dependence upon the hydraulic throughput capacity of the soil-based filter bed in order to thereby substantially even out variations in the waste water inflow; and buffering infed waste water in excess of the hydraulic throughput capacity of the soil-based filter bed, said step of buffering infed excess waste water comprising the steps of:
      infeeding waste water into a buffer reservoir;
      pumping waste water from said buffer reservoir to the inlet of the soil-based filter bed; and
      returning excess waste water, which exceeds the hydraulic throughput capacity of said soil-based filter bed, from the inlet to the buffer reservoir.

11. Method according to claim 10, further comprising the step of selecting the buffer reservoir from the group consisting of the pump well, a settling pond, a single chamber and a multi-chamber man hole or septic tank.

12. Method according to claim 10, wherein the excess waste water is returned to such extent as to prevent excess waste water from flowing along a top surface of the soil-based filter bed.

13. Method according to claim 12, including the step of adjusting a return level in the inlet such as to prevent excess waste water from flowing along the top surface of the soil-based filter bed.

14. Method according to claim 13, wherein the return level is adjusted to the level of the top surface of the soil-based filter bed.

15. Method according to claim 13, wherein the return level is adjusted to variable positions relative to the level of the top surface of the soil-based filter bed.

16. Method of controlling the flow of waste water in a soil-based waste water purifying installation wherein a waste water inflow is infed into an inlet and passed from the inlet through a soil-based filter bed having a predetermined hydraulic throughput capacity, said method comprising the steps of:

controlling the waste water inflow into the inlet in direct dependence upon the hydraulic throughput capacity of the soil-based filter bed in order to thereby substantially even out variations in the waste water inflow; and buffering infed waste water in excess of the hydraulic throughput capacity of the soil-based filter bed, said step of buffering comprising placing a contact buffer into flow communication with said soil-based filter bed through the inlet thereof and infeeding waste water into said contact buffer, and wherein the contact buffer is placed in direct flow communication with an upper section of the soil-based filter bed which upper section has substantially higher hydraulic throughput capacity as compared to a lower section of said soil-based filter bed.

17. Method according to claim 16, further comprising the step of constructing the contact buffer with a variable cross-sectional area which varies from the bottom to the top in correspondence with the variation in the throughput capacity of the upper section of the soil-based filter bed from the bottom to the top of said upper section.

18. Method according to claim 17, wherein the contact buffer has a maximum depth of 0.3 meters below the top surface of the soil-based filter bed.

19. Flow control means associated with a soil-based waste water purifying installation containing a soil-based filter bed, which has a predetermined hydraulic throughput capacity and through which waste water is passed for purification, and further containing an inlet receiving a waste water inflow to be purified in communicating with the soil-based filter bed, said flow control means comprising:

inflow control means associated with the inlet for substantially evening out variations existing in the waste water inflow received by said inlet, said inflow control means controlling said waste water inflow in direct dependence upon the hydraulic throughput capacity of the soil-based filter bed; and buffer means connected to the inlet for taking up excess waste water exceeding the hydraulic throughput capacity of the soil-based filter bed, said buffer means comprising:

contact buffer means of predetermined dimensions, said contact buffer means being combined with the inlet and arranged in immediate flow communicating contact with the soil-based filter bed through said inlet;

a buffer reservoir;

pump means operatively associated with said buffer reservoir;

an infeed conduit leading from said pump means to said inlet; and return means, leading from said inlet to said buffer reservoir, for returning excess waste water, which exceeds the hydraulic throughput capacity of the soil-based filter bed, from the inlet to the buffer reservoir;

wherein, said contact buffer means comprises a contact buffer dimensioned to substantially even out predetermined variations in the waste water inflow and being in flow communication with the buffer reservoir through the infeed conduit and the return means, said pump means associated with said buffer reservoir being put into operation in the presence of waste water inflow variations in excess of the predetermined waste water inflow variations.

20. Flow control means according to claim 19, wherein:

the pump means comprise a pump well; and the buffer reservoir is selected from the group consisting of said pump well, a settling pond, a single chamber and a multi-chamber man hole or septic tank.

21. Flow control means according to claim 20, wherein the return means comprise combined overflow and return means arranged in said inlet for preventing excess waste water from flowing along the top surface of the soil-based filter bed.

22. Flow control means according to claim 21, wherein:

the soil-based filter bed defines a top surface; and the combined overflow and return means comprise an overflow tube having a receiving end which is positioned at the level of said top surface of said soil-based filter bed.

23. Flow control means according to claim 21, wherein:

the soil-based filter bed defines a top surface; and the combined overflow and return means comprise an overflow tube having a receiving end which is adjustable relative to the level of said top surface of said soil-based filter bed.

24. Flow control means according to claim 23, wherein the overflow tube is formed by a tube bend pivotally attached to the return means for pivotable attachment of the receiving end relative to the level of the top surface of the soil-based filter bed.

25. Flow control means according to claim 19, wherein the soil-based filter bed comprises an upper section which has substantially higher hydraulic throughput capacity as compared to a lower section of said soil-based filter bed and wherein the contact buffer means are arranged in direct flow communication with said upper section of the soil-based filter bed.

26. Flow control means according to claim 25, wherein the contact buffer is of a configuration defining a variable cross-sectional area which varies from the bottom to the top in correspondence with the throughput capacity of the upper section of the soil-based filter bed with which upper section of said variable cross-sectional area is in direct flow communicating contact.

27. Flow control means according to claim 26, wherein the contact buffer has a maximum depth of 0.3 meters below the top surface of the soil-based filter bed.

28. Method of controlling the flow of waste water in a soil-based waste water purifying installation wherein a waste water inflow is infed from an inlet and passed from the inlet through a soil-based filter bed having a predetermined hydraulic throughput capacity, said method comprising the steps of:

controlling the waste water inflow into the inlet in direct dependence upon the hydraulic throughput capacity of the soil-based filter bed in order to thereby substantially even out variations in the waste water inflow;

buffering infed waste water in excess of the hydraulic throughput capacity of the soil-based filter bed, comprising placing a contact buffer into immediate flow communication with said soil-based filter bed through the inlet thereof and infeeding waste water into said contact buffer;

infeeding waste water into a buffer reservoir;

pumping waste water from said buffer reservoir to the inlet of the soil-based filter bed;

returning excess waste water, which exceeds the hydraulic throughput capacity of said soil-based filter bed, from the inlet to the buffer reservoir;

using the contact buffer for evening out predetermined variations in the waste water inflow;

flow communicating said contact buffer with a buffer reservoir;

returning waste water from said contact buffer to said buffer reservoir; and pumping waste water from said buffer reservoir to said contact buffer whenever the waste water inflow variation exceeds said predetermined waste water inflow variations.

29. Method according to claim 28 further comprising the step of selecting the buffer reservoir from the group consisting of the pump well, a settling pond, a single chamber and a multi-chamber man hole or septic tank.

30. Method according to claim 29, wherein the excess waste water is returned to such extent as to prevent excess waste water from flowing along a top surface of the soil-based filter bed.

31. Method according to claim 30 further comprising the step of adjusting a return level in the inlet such as to prevent excess waste water from flowing along the top surface of the soil-based filter bed.

32. Method according to claim 31, wherein the return level is adjusted to the level of the top surface of the soil-based filter bed.

33. Method according to claim 31, wherein the return level is adjusted to variable positions relative to the level of the top surface of the soil-based filter bed.

34. A method of controlling the flow of water in a soil-based waste water purifying installation wherein a waste water inflow is infed into an inlet and passed from the inlet through a soil-based filter bed having a predetermined hydraulic throughput capacity, said method comprising the steps of:

controlling the waste water inflow into the inlet in direct dependence upon the hydraulic throughput capacity of the soil-based filter bed in order to thereby substantially even out variations in the waste water inflow; and buffering infed waste water in excess of the hydraulic throughput capacity of the soil-based filter bed, said step of buffering infed excess waste water comprising the steps of:

placing a contact buffer into immediate flow communication with said soil-based filter bed through said inlet thereof and infeeding waste water into said contact buffer;

dimensioning said contact buffer to substantially even out predetermined variations in the waste water inflow;

connecting a buffer reservoir and said contact buffer through an infed conduit and return means of a pump associated with said buffer reservoir; and pumping excess waste water from said buffer reservoir to said contact buffer in the presence of waste water variations in excess of said predetermined variations in said waste water inflow into said contact buffer.

35. Method according to claim 34 further comprising the step of selecting the buffer reservoir from the group consisting of the pump well, a settling pond, a single chamber and a multi-chamber man hole or septic tank.

36. Method according to claim 35, wherein the excess waste water is returned to such extent as to prevent excess waste water from flowing along a top surface of the soil-based filter bed.

37. Method according to claim 36 further comprising the step of adjusting a return level in the inlet such as to prevent excess waste water from flowing along the top surface of the soil-based filter bed.

38. Method according to claim 37, wherein the return level is adjusted to the level of the top surface of the soil-based filter bed.

39. Method according to claim 37, wherein the return level is adjusted to variable positions relative to the level of the top surface of the soil-based filter bed.

40. Method according to claim 34, wherein the contact buffer is placed in direct flow communication with an upper section of the soil-based filter bed which upper section has substantially higher hydraulic throughput capacity as compared to a lower section of said soil-based filter bed.

41. Method according to claim 40, further comprising the step of constructing the contact buffer with a variable cross-sectional area which varies from the bottom to the top in correspondence with the variation in the throughput capacity of the upper section of the soil-based filter bed from the bottom to the top of said upper section.

42. Method according to claim 41, wherein the contact buffer has a maximum depth of 0.3 meters below the top surface of the soil-based filter bed.

* * * * *

UNITED STATES PATENT AND TRADEMARK OFFICE
CERTIFICATE OF CORRECTION

PATENT NO. : 5,637,218
DATED : June 10, 1997
INVENTOR(S) : Reinhold W. Kickuth

It is certified that error appears in the above-identified patent and that said Letters Patent is hereby corrected as shown below:

The sheets of drawings consisting of figures 6-10, should be added as per attached sheets.

Column 7, line 12 after "the" (second occurrence) and before "surface" "top" was omitted.

Column 10, line 12

"560" should be "560 1".

Signed and Sealed this

Seventh Day of October, 1997

Attest:

BRUCE LEHMAN

Attesting Officer

Commissioner of Patents and Trademarks

FIG. 6

FIG. 7 WASTE WATER PASSAGE INTO DIFFERENT DEPTH LAYERS OF HORIZONTALLY THROUGHFLOWN, ROOT-PENETRATED SOIL BODY IN PERCENT OF PASSAGE INTO TOP LAYER